United States Patent
Powell et al.

(10) Patent No.: US 10,961,671 B2
(45) Date of Patent: Mar. 30, 2021

(54) APPARATUS AND METHOD FOR ATTACHING SIGNS TO FOUNDATION MEMBERS SUCH AS ROAD BARRIERS

(71) Applicants: AMG METALS, INC., Newmarket (CA); POWELL (RICHMOND HILL) CONTRACTING LIMITED, Gormley (CA); STINSON EQUIPMENT LIMITED O/A STINSON OWL-LITE, Concord (CA)

(72) Inventors: Ben Powell, Sharon (CA); John David Pierson, Newmarket (CA); James Harold Delamere, Toronto (CA); Mohammad Bagher Vakili, Toronto (CA)

(73) Assignees: AMG Metals, Inc., Newmarket (CA); Powell (Richmond Hill) Contracting Limited, Gormley (CA); Stinson Equipment Limited o/a Stinson Owl-Lite, Concord (CA)

( * ) Notice: Subject to any disclaimer, the term of this patent is extended or adjusted under 35 U.S.C. 154(b) by 31 days.

(21) Appl. No.: 16/318,425

(22) PCT Filed: Jun. 22, 2017

(86) PCT No.: PCT/CA2017/050766
§ 371 (c)(1),
(2) Date: Jan. 17, 2019

(87) PCT Pub. No.: WO2018/014110
PCT Pub. Date: Jan. 25, 2018

(65) Prior Publication Data
US 2019/0242079 A1    Aug. 8, 2019
US 2020/0048848 A9    Feb. 13, 2020

Related U.S. Application Data

(63) Continuation-in-part of application No. 15/572,534, filed as application No. PCT/CA2016/050585 on May 24, 2016.

(30) Foreign Application Priority Data

May 25, 2015 (CA) .............................. CA 2892412
Jul. 18, 2016 (CA) .............................. CA 2936367

(51) Int. Cl.
*E01F 9/669* (2016.01)
*F16M 13/02* (2006.01)
(Continued)

(52) U.S. Cl.
CPC ............ *E01F 9/669* (2016.02); *E01F 15/003* (2013.01); *F16M 13/022* (2013.01); *G09F 15/0037* (2013.01); *G09F 2007/1878* (2013.01)

(58) Field of Classification Search
CPC ...... E01F 9/669; E01F 15/003; F16M 13/022; G09F 15/0037; G09F 2007/1878
See application file for complete search history.

(56) References Cited

U.S. PATENT DOCUMENTS 4,037,824 A * 7/1977 Whitmer ............ A62B 35/0056
256/53
4,050,401 A    9/1977 Kelly
(Continued)

FOREIGN PATENT DOCUMENTS

CA    2178827 A1    6/1995
CA    2892412 A1    11/2016
(Continued)

OTHER PUBLICATIONS

International Search Report for PCT/CA2016/050585 dated Aug. 17, 2016.
(Continued)

*Primary Examiner* — Anita M King
(74) *Attorney, Agent, or Firm* — Caesar Rivise, PC

(57) ABSTRACT

A support system for a sign mountable on at least two spaced apart foundation members, the system comprising: i) a base,
(Continued)

preferably a length adjustable base, having a first end and a second end; ii) a vertical sign support having a first end and a second end wherein the second end is connected to the base; iii) a first foundation member bracket for connection to a first foundation member, the first foundation member bracket proximate the first end of the base; and iv) a second foundation member bracket for connection to a second foundation member distant the first foundation member, the second foundation member bracket proximate the second end of the base.

57 Claims, 18 Drawing Sheets

(51) Int. Cl.
  *G09F 15/00* (2006.01)
  *E01F 15/00* (2006.01)
  *G09F 7/18* (2006.01)

(56) References Cited

U.S. PATENT DOCUMENTS

| | | | | |
|---|---|---|---|---|
| 5,029,670 | A * | 7/1991 | Whitmer | A62B 35/0056 182/113 |
| 5,307,897 | A * | 5/1994 | Turner | A62B 35/04 182/3 |
| 5,339,475 | A * | 8/1994 | Jaeger | E01D 2/02 14/73 |
| 5,346,036 | A * | 9/1994 | Arisman | A62B 35/04 182/3 |
| 5,472,162 | A | 12/1995 | Mason | |
| 6,107,941 | A * | 8/2000 | Jones | G08G 1/0955 116/63 R |
| 6,237,883 | B1 | 5/2001 | Levin et al. | |
| 6,718,672 | B1 | 4/2004 | Wieringa | |
| 7,163,083 | B2 * | 1/2007 | Argoud | A62B 35/04 182/113 |
| 7,621,493 | B2 * | 11/2009 | Vermette | B60R 9/10 224/500 |
| 8,640,370 | B2 | 2/2014 | Mandl et al. | |
| 2008/0307684 | A1 | 12/2008 | Ulloa et al. | |
| 2013/0247435 | A1 | 9/2013 | Bacik | |

FOREIGN PATENT DOCUMENTS

| | | |
|---|---|---|
| EP | 2105907 A3 | 10/2009 |
| ES | 2293771 | 3/2008 |

OTHER PUBLICATIONS

Supplementary European Search Report for EP 16 79 8992 dated Dec. 13, 2018.
English-language abstract for ES 2293771B1 (2008).
International Search Report for PCT/CA2017/050766 dated Sep. 29, 2017.

* cited by examiner

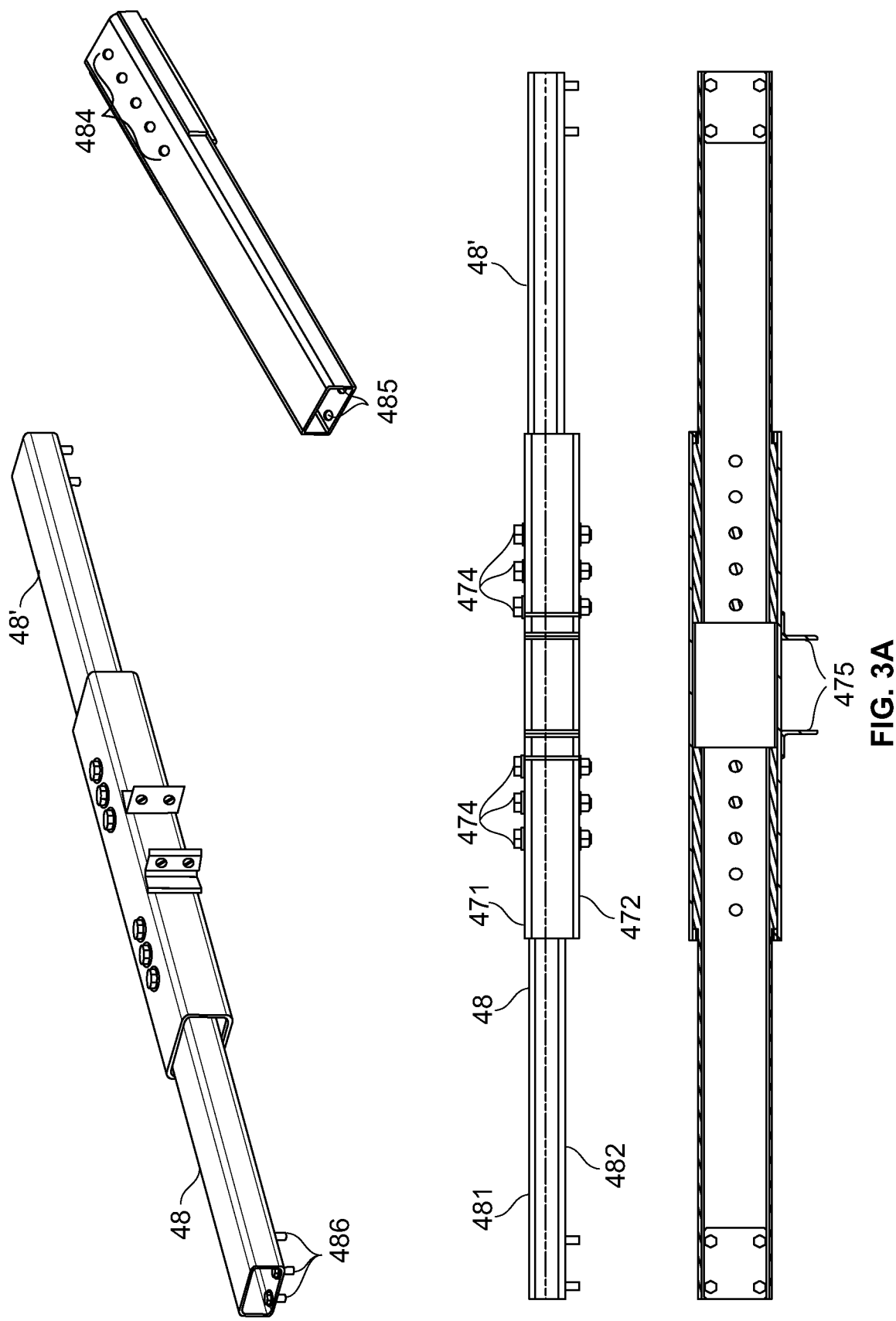

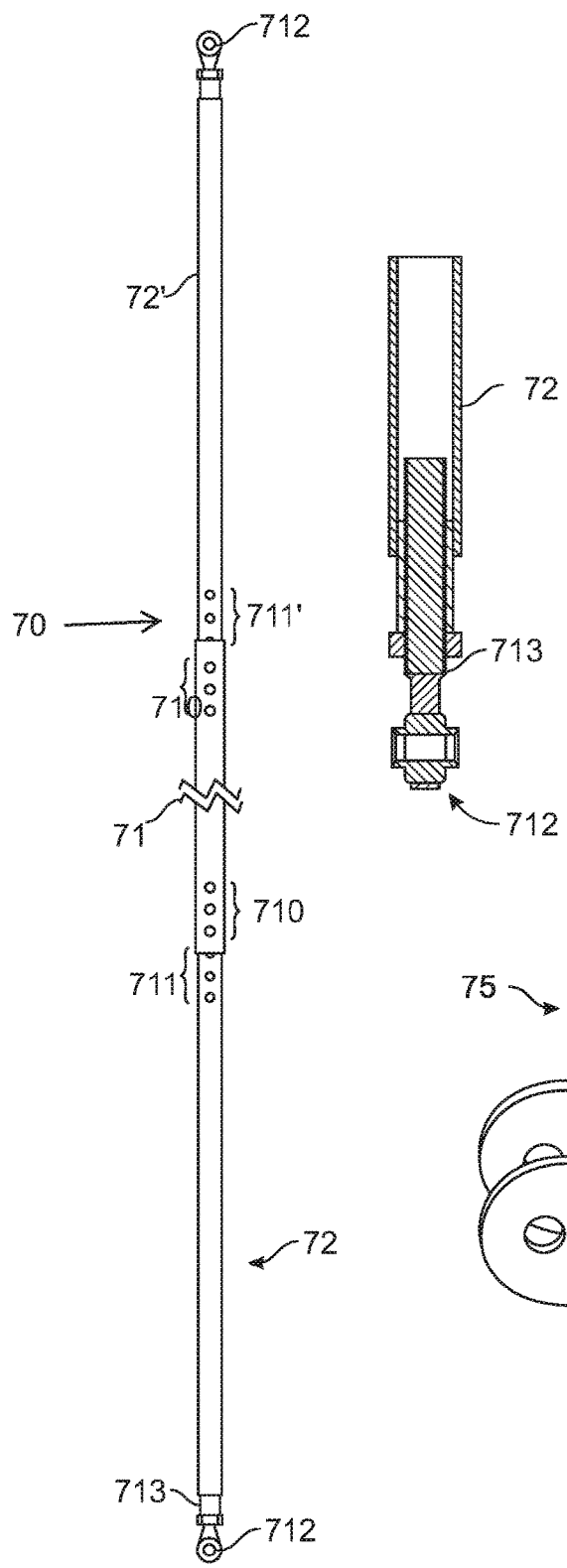
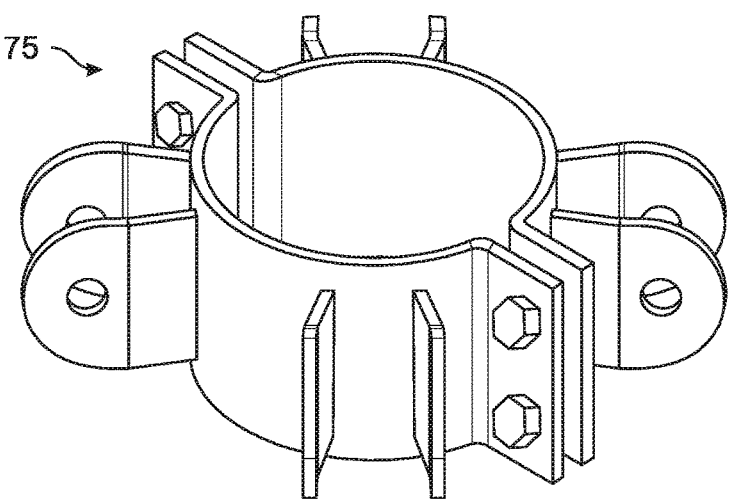
FIG. 5A
FIG. 5B

APPARATUS AND METHOD FOR ATTACHING SIGNS TO FOUNDATION MEMBERS SUCH AS ROAD BARRIERS

CROSS-REFERENCE TO RELATED APPLICATIONS

This application is a U.S. national phase application of PCT/CA2017/050766, filed Jun. 22, 2017, which claims priority to Canadian Patent Application No. 2936367, filed Jul. 18, 2016. This application is also a Continuation-in-Part application of United States National Phase Ser. No. 15/572,534 filed on Nov. 8, 2017, which is a U.S. national phase application of PCT/CA2016/050585 filed on May 24, 2016 which claims priority to Canadian Patent Application No. 2892412 filed May 25, 2015.

FIELD OF THE DISCLOSURE

The present disclosure relates to improvements to the attachment of signs, and other equipment, to a foundation, preferably road barriers, in particular concrete road barriers, and in particular a support, for a portable variable message sign, that may be rapidly deployed onto a temporary road barrier.

BACKGROUND

Currently, road signs, and in particular portable variable message signs (PVMS) used on roadways during road construction or when traffic is being redirected, require permanent footings, typically permanent concrete footings, or a portable trailer requiring protection from traffic. Permanent signs cannot be installed cost-effectively for temporary application and do not typically allow for rapid deployment due to the requirement of permanent concrete footings. Portable trailer mounted signs are restricted in sign size and require protection from traffic as well as requiring a wide enough base and ballast to prevent toppling of the sign, due to high winds, wind turbulence or the like. Furthermore, the current systems do not allow for rapid relocation of the signs, upon completion of the work or redirection of traffic, to another site. Other temporary road signs have a frame constructed of wood secured to the ground by sand bags or the like. The above systems do not accommodate roadways separated by a barrier or median in which the roadways are of different elevation. In this instance, the temporary road signs may not be level facilitating reading thereof, or shims are required to level the sign.

U.S. Pat. No. 5,244,172 describes a U-shaped saddle for mounting a post for a sign to a concrete barrier. U.S. Pat. No. 8,230,628 describes a precast concrete road barrier which includes a recessed channel, within and extending lengthwise of the barrier, for receiving a sign. U.S. Pat. No. 4,338,041 describes a glarefoil assembly for mounting to a median barrier.

The above systems rely on the integrity of the permanent concrete median barrier for support and cannot be utilized with steel beam guide rail medians or on shoulders of a roadway. There is a need for a roadway sign base support that does not rely on the integrity of the permanent median barrier for support and may be installed in conjunction with any type of median barrier such as a permanent barrier (including a ditch or the like) and temporary barriers, and/or installed where a barrier is not present. There is also a need for a support system that may accommodate signs of various sizes. There is also a need for a support system that may accommodate roadways with different elevations. There is also a need for a support system that may accommodate permanent median barriers of varying heights. There is also a need for a support system that mitigates rotational forces on the system during high winds or impact. There is also a need for a support system that allows for absorbing impact loads. There is also a need for a support system that mitigates damage and injury during high winds or impact by a vehicle. There is also a need for a support system that is compliant with crash test standards.

SUMMARY

According to one aspect, there is provided a support system, preferably for a sign, more preferably for a variable message sign, mountable on at least two foundation members, preferably barriers, preferably two median barriers, preferably each of said foundation members comprising at least one of a barrier wall section, a temporary or permanent barrier, a temporary tall wall barrier, a pre cast concrete, a pile, a screw pile, a helical pile, a rock anchor, a mass of concrete, metal or other material, a ballast system, metal scaffolding/framing capable of supporting a load, and combinations thereof, and in one embodiment further comprising a permanent foundation in combination with any of the above, preferably two longitudinally spaced apart median barriers, said system comprising:
  i) a base support having a first end and a second end, preferably being length adjustable, preferably two length adjustable base supports, preferably each of said first end and second end being articulately connectable to a first and second foundation member respectively; preferably each length adjustable base support comprises a central portion and two end portions, wherein each of said end portions engage telescopically with said central portion, preferably via complementary apertures allowing for connecting of each of said end portions to said central portions via said apertures with a fastener through said complementary apertures, preferably a plurality of fasteners, more preferably a bolt through aligned complimentary apertures of the central portion and said end portions; wherein said complementary apertures on said central portion are larger than the complementary apertures on each of said end portions. In another embodiment, said complementary apertures on said central portion are smaller than the complementary apertures on each of said end portions; wherein the combination of the larger and smaller apertures allow for length adjustment of said base support for example during installation on said foundation members) and for movement during an impact and/or load and/or seismic force or collision; in one embodiment, said larger apertures are elongated slots;
  ii) optionally, a central base support, for connecting said two length adjustable base supports;
  iii) a vertical support for supporting an item, preferably a sign, said vertical support having a first end and a second end wherein said second end is connectable to said base support; preferably to said central base support; preferably said vertical support being articulately connectable to said base support, preferably to said central base support; in one embodiment, said vertical support is length adjustable; at least one item tether for tethering said at least one item to said vertical support, preferably a sign tether for tethering said sign to said vertical support; preferably said at least one item tether is a cable, more preferably a steel cable or like;

iv) in one embodiment said base support further comprises a first foundation member bracket for connection to a first foundation member, said first foundation member bracket proximate said first end of said base support; preferably said first length adjustable base support;

v) in another embodiment, said base support further comprises a second foundation member bracket for connection to a second foundation member distant said first foundation member, said second foundation member bracket proximate said second end of said base support; preferably said second length adjustable base support;

vi) in another embodiment, said second base support further comprises a first foundation member bracket for connection to said first foundation member, said first foundation member bracket proximate said first end of said second base support; preferably said second length adjustable base support;

vii) in another embodiment, said second base support further comprises a second foundation member bracket for connection to a second foundation member distant said first foundation member, said second foundation member bracket proximate said second end of said second base support; preferably said second length adjustable base support; preferably each of said foundation member brackets being articulately adjustable and connectable on said respective foundation member; and viii) optionally at least one vertical brace, preferably a length adjustable vertical brace, preferably at least two length adjustable vertical braces, more preferably at least four length adjustable vertical braces, said vertical brace having a first end and a second end; wherein said first end of said vertical brace is connectable, preferably pivotally connectable, to said vertical sign support between said first end and said second end of said vertical sign support; and said second end of said vertical brace is connectable proximate one end of said base support; preferably said second end of said vertical brace is pivotally connectable to at least one of said foundation member brackets.

In one embodiment, said base support further comprises at least one vertical support connector for reducing a) rotation of said vertical support on said base support and b) detachment of said vertical support from said base support.

In another embodiment, said system further comprises at least one vertical brace tether for tethering said at least one optional vertical brace to said base support. Preferably said at least one vertical brace tether is a chain, more preferably a steel chain.

In one embodiment, said system further comprises a sign, preferably a variable message sign, connectable to said vertical sign support. In a preferred embodiment, said system further comprises a least one sign tether for tethering said sign to said vertical sign support; preferably said at least one sign tether is a cable, more preferably a steel cable.

In another embodiment, said system may support at least one of the following in addition to the sign and/or independent of said sign, as required:

At least one sensor, preferably selected from a radar based traffic monitoring sensor, Bluetooth vehicle tracking sensor, video detection traffic monitoring sensor, weather station equipment for monitoring at least one of wind, temperature, barometer, humidity, and radar, road temperature sensor, road surface sensor (e.g. ice, oil, etc.), pollution monitoring sensor, a CCTV camera (that may be remotely controlled) and combinations thereof;

At least one communication device, preferably selected from a cellular modem (e.g. 3G or LTE), Bluetooth (near field communications for sign or other device control), wi-fi modem for same as above, satellite cellular modem (for areas outside cell tower range) and combinations thereof.

In yet another embodiment, said system further comprises a power source, preferably a solar panel and battery, for providing power to said sign. In another embodiment, said solar panel is connectable, preferably pivotally connectable proximate said second end of said vertical sign support. In a preferred embodiment, said system further comprises at least one solar panel tether for tethering said solar panel to said vertical sign support, preferably said at least one solar panel tether is a cable, more preferably a steel cable.

In any of the embodiments, said at least one solar panel tether, said at least one item tether and said at least one vertical brace tether is selected from a chain, cable and combinations thereof. Preferably Grade 70 Transport Chain.

In yet another embodiment, said power source may further comprise an alternate power source, preferably comprising a wind turbine generator, preferably to trickle charge the battery when there is insufficient solar power such as through the winter months in climactic regions where there is less sunlight hours and intensity in winter months, a generator, preferably a propane, gas or diesel generator, a fuel cell, preferably a hydrogen or other type of fuel cell. In yet another embodiment, said solar panel further comprises an actuated solar tracking system.

Preferably said system further comprises a controller for controlling at least one of the following: message on said sign, power to said sign, data transmission and reception from and to said system and combinations thereof.

In one embodiment, said system, may accommodate median barriers of various sizes, shapes and widths as well as accommodate median barriers longitudinally spaced apart from each other at various distances.

In one embodiment, said first end of said at least one vertical brace is movably connected to said vertical sign support, preferably movably connected via a collar, preferably sliding adjustable, running along the vertical sign support. In another embodiment, said vertical brace is a cable or the like.

In one embodiment, each of said base support is length adjustable, preferably telescopically adjustable with at least one stop for fixing the length of said base at a desired length.

In one embodiment, each of said foundation member brackets further comprise at least one connector, preferably a plurality of connectors for securely connecting said brackets to said foundation members. The at least one connector preferably to removably secure said brackets to said foundation members. Preferably said at least one connector is an anchoring device for anchoring to said foundation member, preferably a threaded rod running through each of said foundation member bracket. Preferably each of said foundation member bracket is articulately connectable to a side of a foundation member.

In another embodiment the system further comprises at least two barriers, preferably at least two temporary concrete barriers. In another embodiment, the system further comprises at least one permanent barrier and one temporary barrier.

Although any suitable material that will meet the requirements of the specific situation, the preferred material to be used for the brackets, base support, central support and vertical support, and vertical brace is steel (galvanized or painted).

An alternative material is aluminum, stainless steel and combinations of all these materials.

A preferred connector for the brackets include anchors or bolts drilled into or through the foundation member, clamped to utilize friction forces and combinations thereof.

According to another aspect, there is provided a method of mounting a vertical support for a sign to at least two spaced apart foundation members, preferably two spaced apart median barriers, more preferably two longitudinally spaced apart concrete barriers, even more preferably of mounting a support system as disclosed herein, comprising the steps of:

i) anchoring at least one support bracket to each spaced apart foundation member;
ii) mounting, preferably articulately mounting at least one base support, preferably a length adjustable base support having two ends, preferably two length adjustable base supports separated by a central base support, to said at least one support bracket;
iii) attaching, preferably articulately attaching, a vertical support to said base support, preferably to said central base support;
iv) levelling said vertical support;
v) attaching said sign to said vertical support;
vi) attaching a solar panel to said vertical support;
vii) orienting said sign and said solar panel as required; and
viii) tightening attachments ensuring a secure connection.

Preferably said method further comprises attaching and adjusting said at least one vertical brace, preferably at least two vertical braces, substantially normal to each other, between said vertical support and said base support. More preferable attaching and adjusting at least three vertical braces between said vertical support and said base support. Even more preferably attaching and adjusting at four vertical braces, wherein each vertical brace is normal to each other, between said vertical support and said base support.

In one embodiment, the solar panel is connected directly to the sign. In another embodiment, the solar panel is connected to the battery and the battery is connected to the sign. In yet another embodiment, the solar panel is connected to the battery, the battery is connected to the controller and the controller is connected to the sign.

In another embodiment, said system is Manual for Assessing Safety Hardware (MASH) compliant and/or Canadian Highway Bridge Design Code compliant for at least one of wind, seismic, environmental loading and combinations thereof, and/or American Association of State Highway and Transportation Officials (AASHTO compliant MASH is part of (AASHTO). MASH provides evaluation techniques for the crash testing of safety hardware devices for use on the National highway System (NHS). MASH presents uniform guidelines for crash testing permanent and temporary highway safety features and recommends evaluation criteria to assess test results. Tests under MASH are determined by the testing agency and are required to test the most vulnerable components of safety hardware devices. This may vary depending on the opinion of the testing engineer. Some criteria include light truck test vehicle should be 2270P vehicle; gating terminal and crash cushion impact angle is 5 degrees; variable message signs and arrow board trailers are added to a TMA ((Truck Mounted Attenuator) also known as a "crash truck", they are large trucks >5 ton that have crash attenuators mounted to the back to safely stop impacting vehicles) crash test matrix; support structure and work zone traffic control device is included in light truck testing; windshield damage criteria is included and vehicle rebound in crash cushion tests is required. The MASH report is available at https://bookstore.transportation.org.

The Canadian Highway Bridge Design Code and AASHTO apply to the design, evaluation, and structural rehabilitation design of fixed and movable highway bridges including provisions for the design of barriers, highway accessory supports of a structural nature, such as lighting poles, and sign support structures.

These and other objects will become more apparent from the accompanying figures in the following detailed description.

BRIEF DESCRIPTION OF THE FIGURES

FIG. 3A depicts the base support in a preferred embodiment.

FIG. 5A depicts the vertical brace in a preferred embodiment.

FIG. 5B depicts a perspective view of the collar for the brace of FIG. 5A.

DETAILED DESCRIPTION

Figure 1:
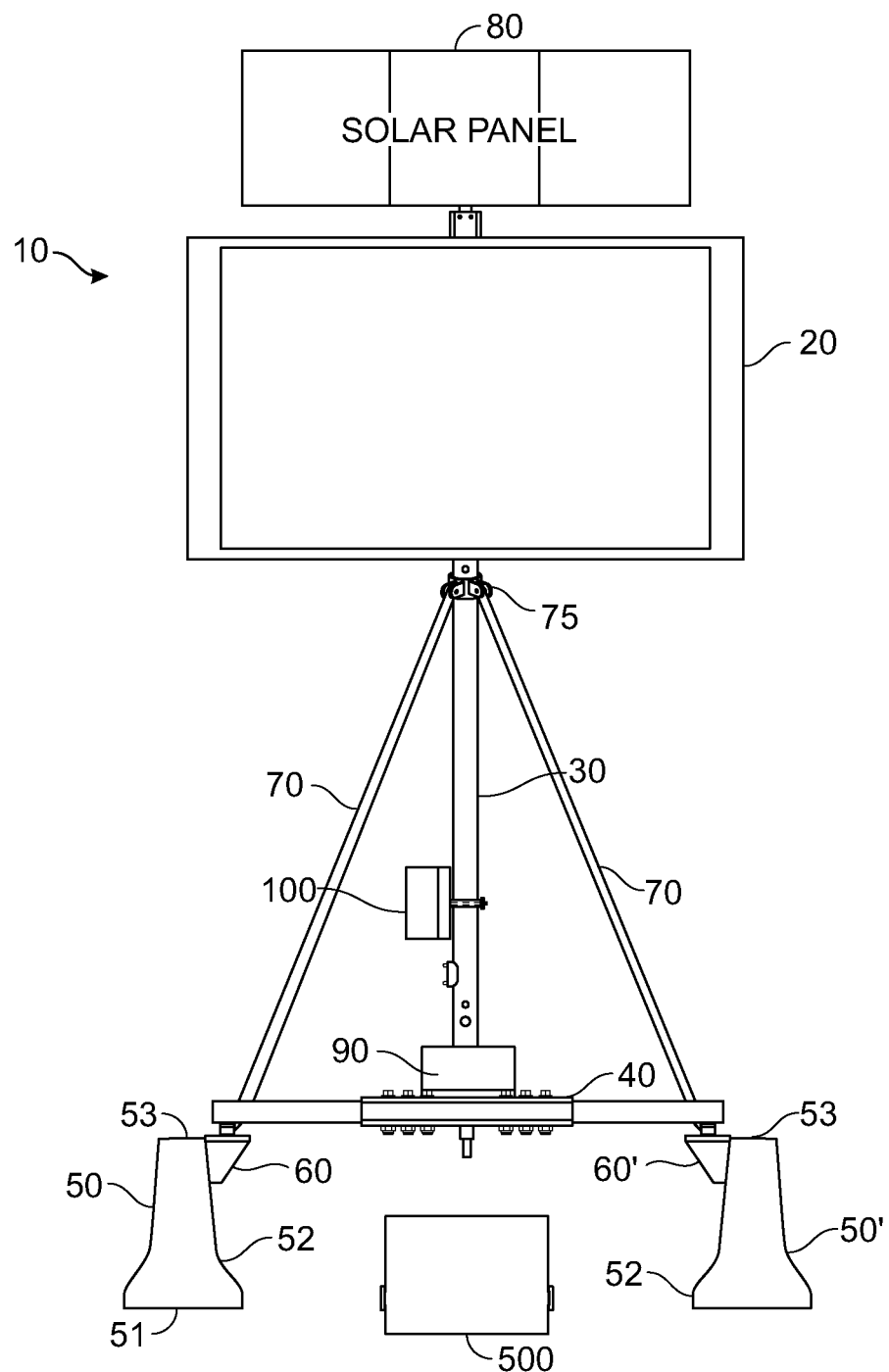
FIG. 1 is a front view of the system in a preferred embodiment.
Figure 2:
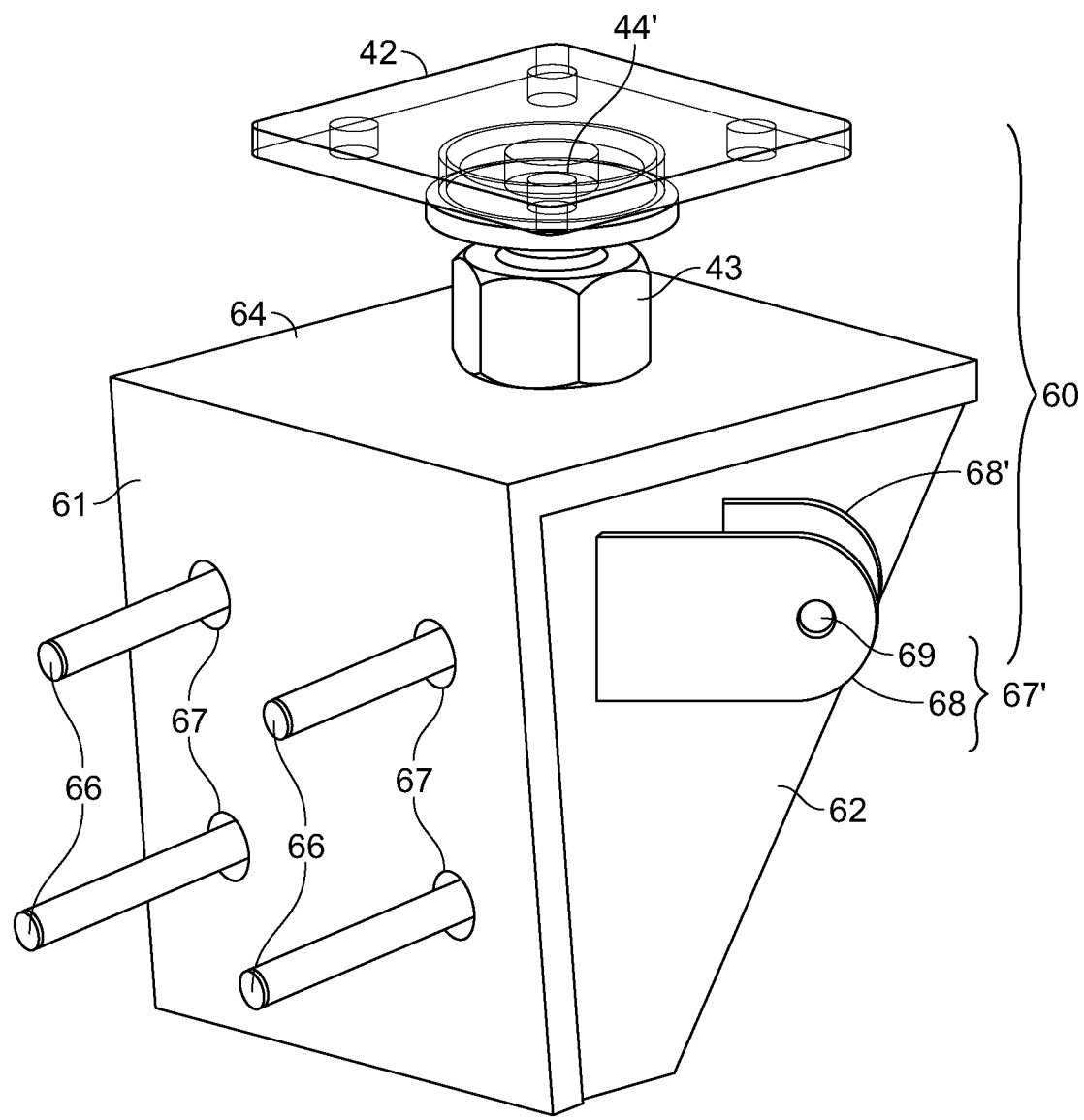
FIG. 2 is a perspective view of the bracket in a preferred embodiment.
Figure 2A:
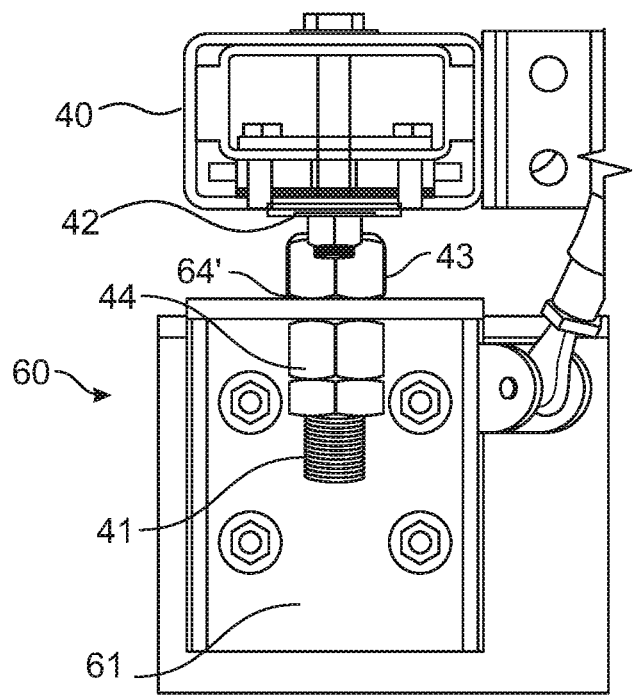
FIG. 2A is a front view of the bracket of FIG. 2.
Figure 2B:
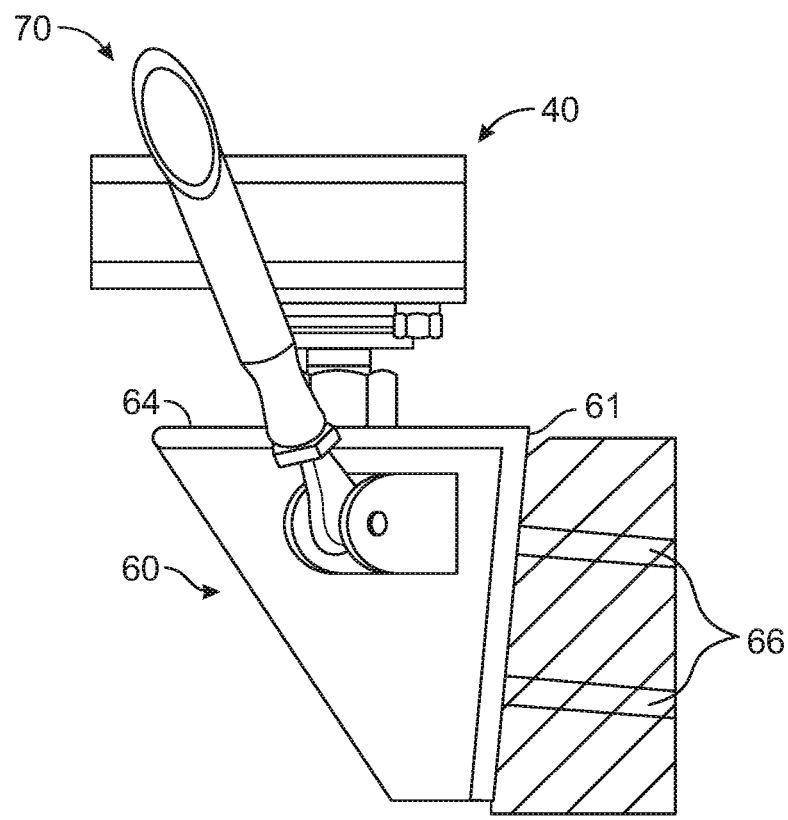
FIG. 2B is a side view of the bracket of FIG. 2.
Figure 2C:
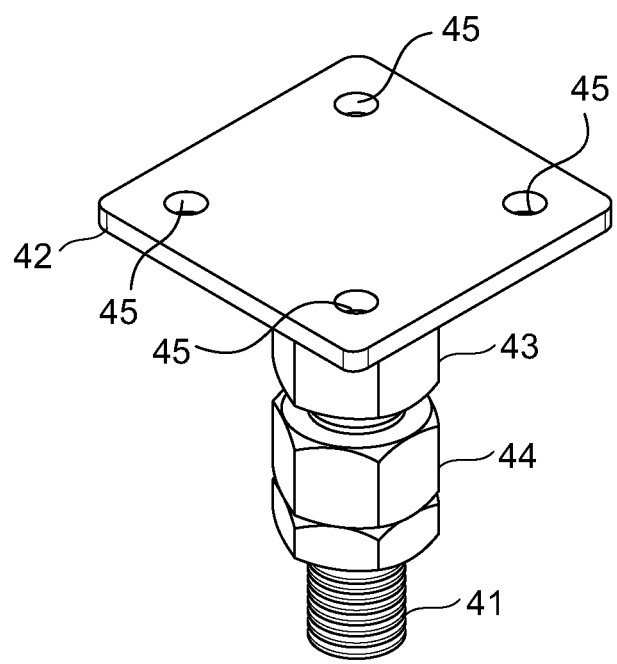
FIG. 2C is a perspective view of the articulating plate in a preferred embodiment.
Figure 2D:
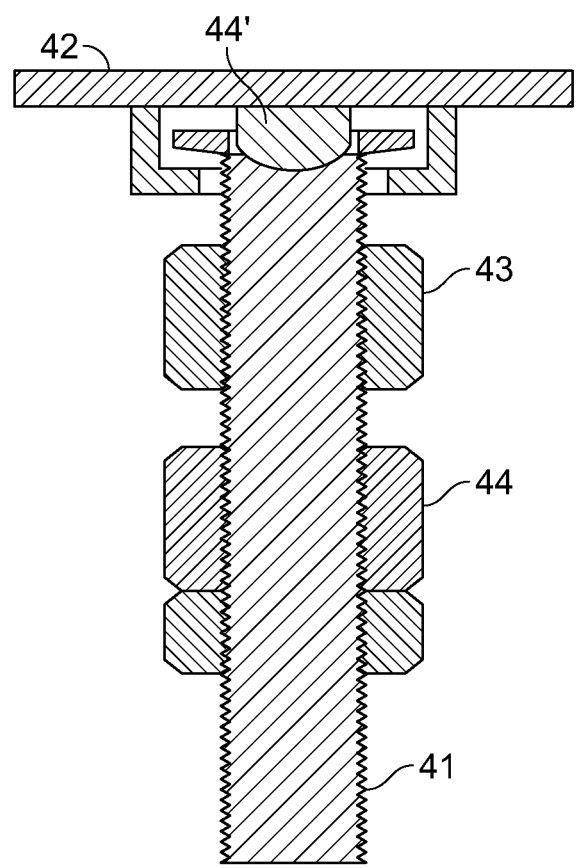
FIG. 2D is a cross sectional view of the plate of FIG. 2C.
Figure 3:
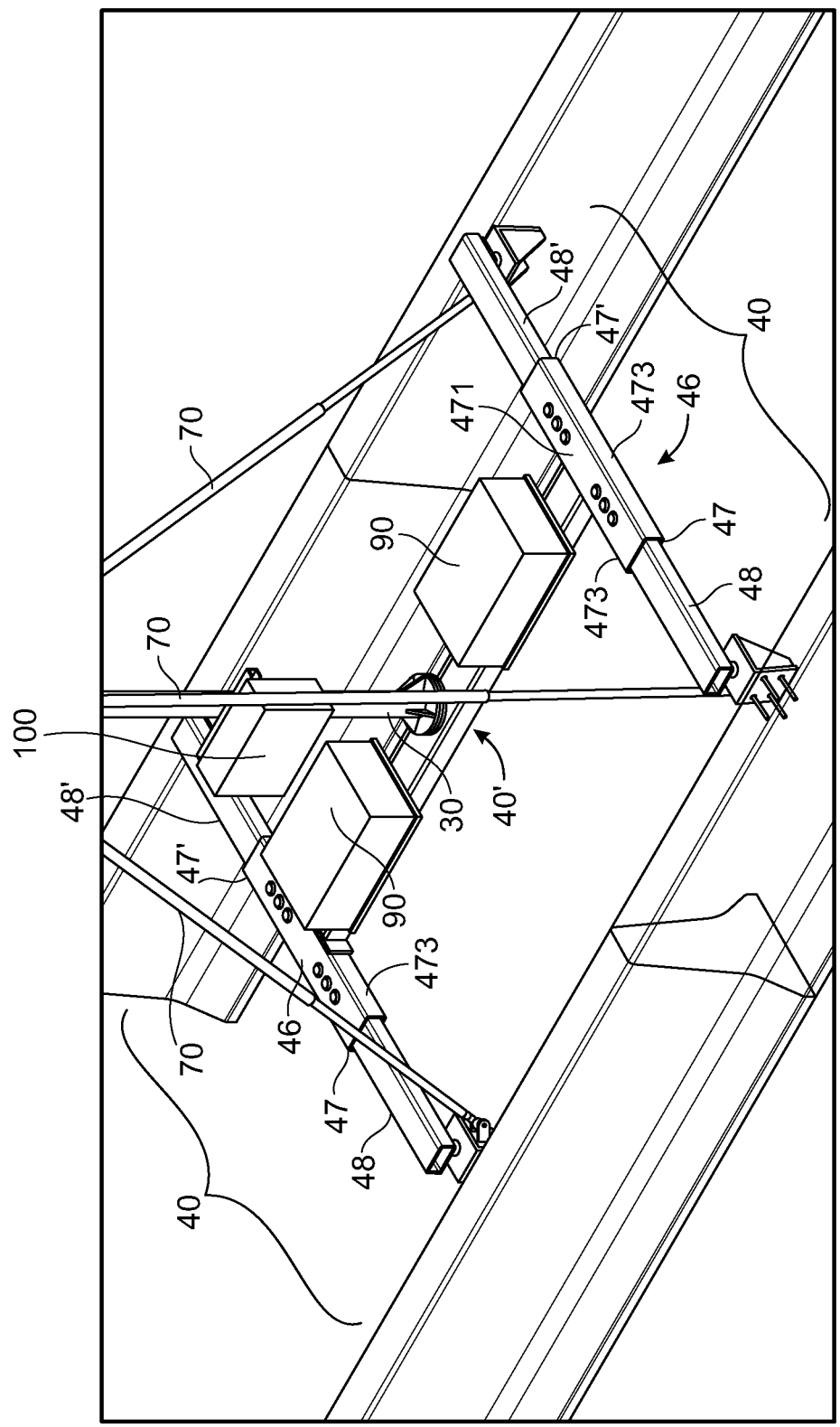
FIG. 3 is a perspective view of the system of FIG. 1.
Figure 4:
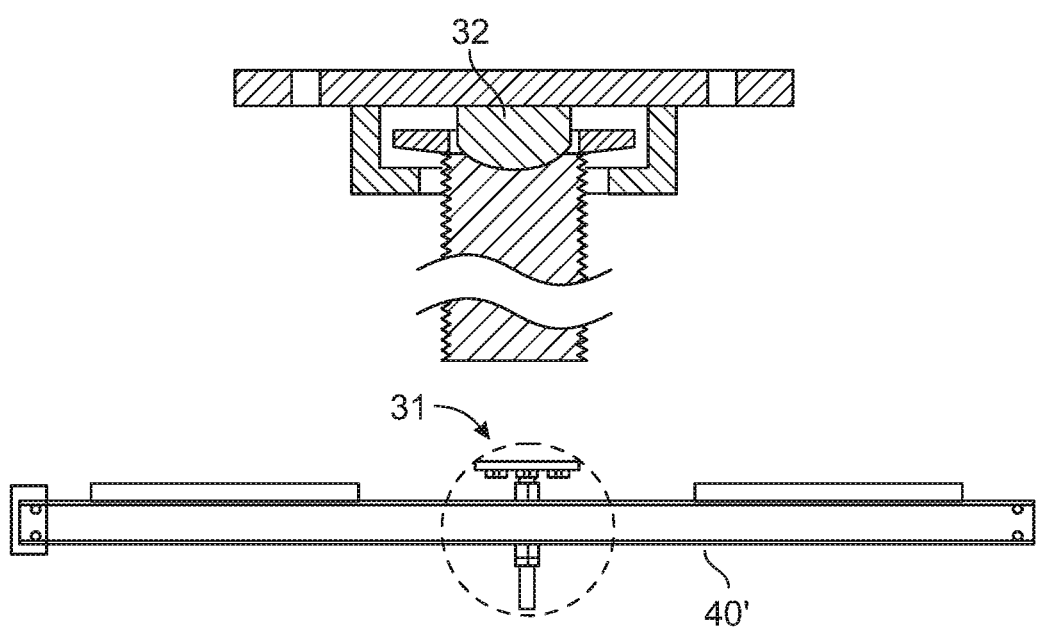
FIG. 4 depicts the central support and articulating joint of the central support in a preferred embodiment.
Figure 4A:
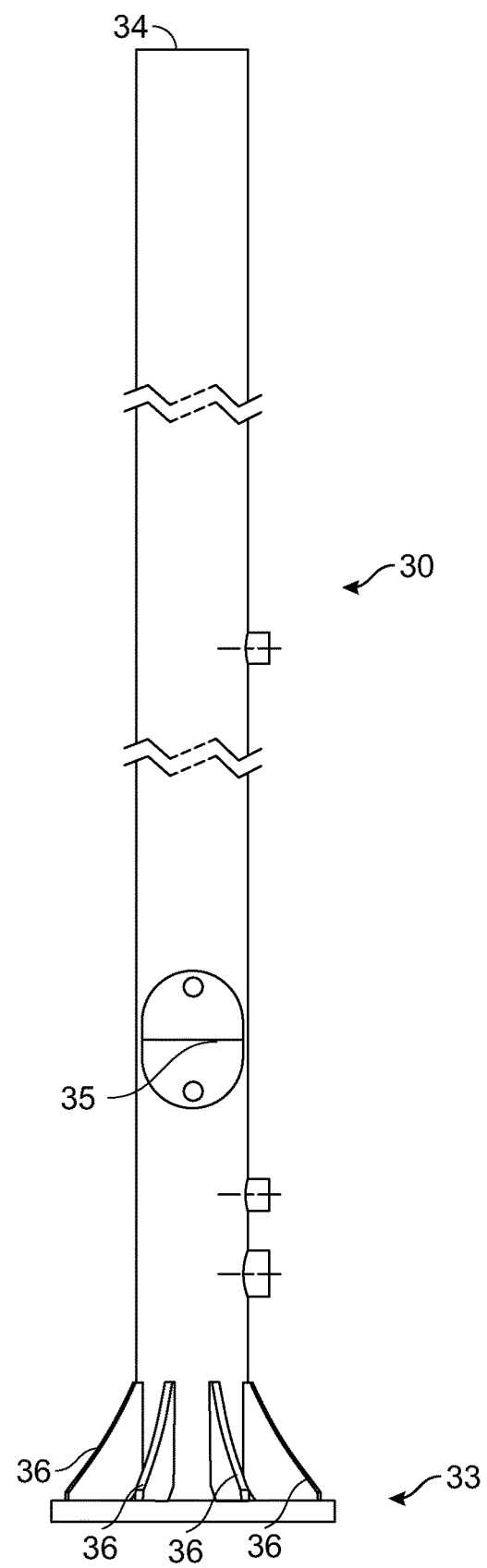
FIG. 4A depicts the central support in a preferred embodiment.

Referring now to FIG. 1, a temporary sign support system is indicated generally at 10. The system 10 comprises a sign 20, a vertical support 30 (fixed in length in this embodiment but may be adjustable in length), a horizontal base 40, connected to concrete barriers 50, 50' via support brackets 60, 60'. The system includes an optional vertical brace 70. When the system comprises 2 vertical braces 70, normal to each other, to further support vertical support 30, the system is AASHTO and CHBDC compliant. The system further comprises a solar panel 80, a battery box 90 (in this embodiment two battery boxes) and a controller 100. The concrete barriers 50, 50' are of the type used to protect a work site as well as redirecting traffic flow during construction or accidents or the like. The concrete barriers 50, 50' allow for the support system 10 to straddle an existing permanent median 500, which divides two traffic roadways, typically two roadways of opposing traffic flow, which may be a concrete median, a steel median, a ditch, or the like. Although depicted here using two temporary concrete barriers, the support system may be used with two permanent barriers, or a combination of a temporary and permanent barrier or a combination of any foundation member. Each concrete barrier 50 (and 50') has a wide base 51 and walls 52 that taper upward to a narrow flat top 53. The base 51 is typically 800 mm in width and the height is typically 1125 mm. As best seen in FIGS. 2, 2A and 2B, the support bracket (60, 60') is used to connect the system 10 to the concrete barriers 50, 50' are depicted. FIG. 2 is a perspective view, FIG. 2A is a front view and FIG. 2B is a side view. Also depicted in FIGS. 2A and 2B are the vertical braces 70 and horizontal base 40 attached to the support bracket 60. The support bracket 60 has a back 61 two sides 62, 62' and a top 64. Four threaded rods 66 are shown going through the threaded rod apertures 67 which run through the back 61 of the support bracket 60 in a slightly angled horizontal plane to assist in the securement of the bracket 60 onto the wall 52 proximate the top 53 of the concrete barrier 50. The threaded rods 66 are preferably ASTM A193 grade B7, but any suitable material may be used. The support bracket 60 may be made of steel, however any suitable material may be chosen. Bracket 60 includes on top 64, an aperture 64' to receive the horizontal base 40. In particular, a threaded rod 41, with an articulately connected base plate 42 at one end of said threaded rod, is attached to said bracket top 64 via said aperture 64'. In this instance, the aperture is threaded to complement and securely receive the threaded rod 41. The threaded rod 41 is further secured onto the top 64 of the bracket 60, by the placement of a hex nut 43 on the threaded rod 41 above the top 64 and a hex nut 44 on the threaded rod 41 below the top 64, such that the hex nuts 43, 44 are tightened on said threaded rod 41 such that the threaded rod 41 is securely attached to the bracket 60. The base plate 42 is square in shape and is articulately connected to said threaded rod 41 by a ball joint 44', allowing the base plate 42 to articulate on said threaded rod 41 allowing for any angular adjustment of said horizontal base 40, when connected onto the wall 52 of the concrete barriers 50, 50'. The preferred material for the ball joint 44' is AISA 4140 Alloy Steel (Fy=415 MPa) but any suitable material may be used. The base plate 42 further comprises four apertures 45 to receive the horizontal base 40. The preferred material for the base plate 42 is steel but any suitable material may be used. Referring now to FIGS. 3 and 3A, Horizontal base 40, in this embodiment, includes a pair of end supports comprising of rectangular hollow shaped central portion 46 with two ends 47, 47', a top 471, bottom 472 and two sides 473, and a central support 40' connecting the pair of end supports. The central portion 46 includes a plurality of spaced apart apertures 474 aligned and running through said top 471 and bottom 472. Each end 47, 47' receives a rectangular hollow shaped end portion 48, 48'. Each end portion 48, 48' include a top 481, bottom 482 and two sides 483. Each end portion 48, 48' comprise a plurality of spaced apart apertures 484 aligned and running through said top 481 and bottom 482. As best seen in FIG. 3A, each end portion 48, 48' are received by the central portion 46 and connected to each other via hex bolts running through apertures 474 and 484. As can be seen, in this embodiment, end portions include more apertures than the central portion. This allows for adjusting the length of the horizontal base 40 as needed, accommodating barriers that are separated at various distances from each other. In another embodiment, end portions 48, 48' may be of different lengths to further accommodate various lengths. In yet another embodiment end portions 48, 48' of various lengths, along with apertures 474 and 484 spaced apart at various intervals, along with shims and/or shim plates may be used in combination to accommodate barriers separated at various distances. End portions include at one end thereof, distant the apertures 484, base plate connector apertures 485 for alignment with apertures 45 of said base plate 42. In this embodiment four hex bolts 486 are used to connect the horizontal base 40 to said support bracket 60, 60'. On one side 473 of central portion 46, are two spaced apart steel plates 475 to receive the central support 40' that receives vertical support 30, via a vertical support connector 31, as best seen in FIG. 4. In this embodiment, vertical support connector 31 comprises a ball swivel joint 32 similar to the ball joint 44 described above. As best seen in FIG. 4A, vertical support 30, comprises a steel column having a base 33 and a top 34. Base 33 is connected to the ball swivel joint 32 which in turn is connected to the central support 40'. Proximate the base thereof, vertical support 30 further comprises a hand hole 35 to facilitate movement during installation and deinstallation of said system as well as facilitate running any wires through the vertical support 30 as needed. Said vertical support base 33 is comprised of a plurality of vertically oriented reinforcement ribs 36, which further enhance rigidity. Support bracket 60 includes on side 62 a vertical brace connector 67'. In this embodiment the vertical brace connector 67 is a pair of spaced apart plates 68, 68' to receive the vertical brace 70. Each plate 68, 68' includes an aperture 69, 69' for pivotally receiving the vertical brace 70.

Figure 5C:
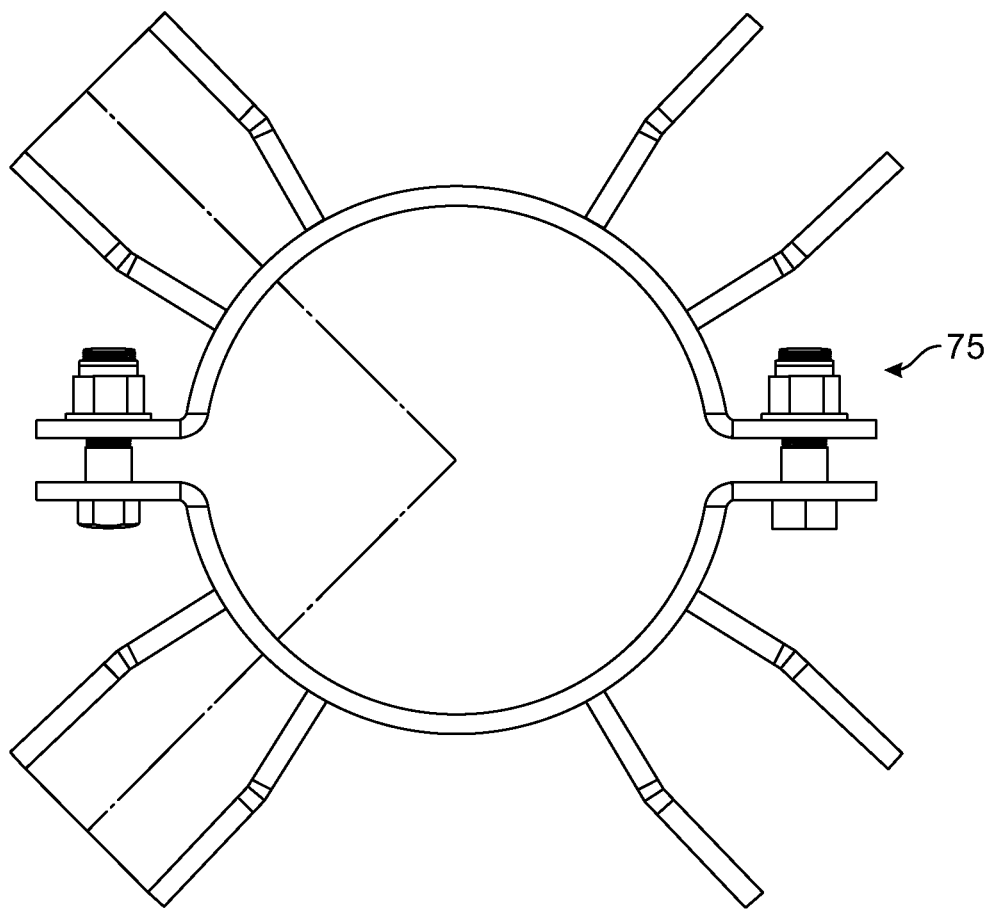
FIG. 5C depicts an overhead view of the collar of FIG. 5B.
Figure 6:
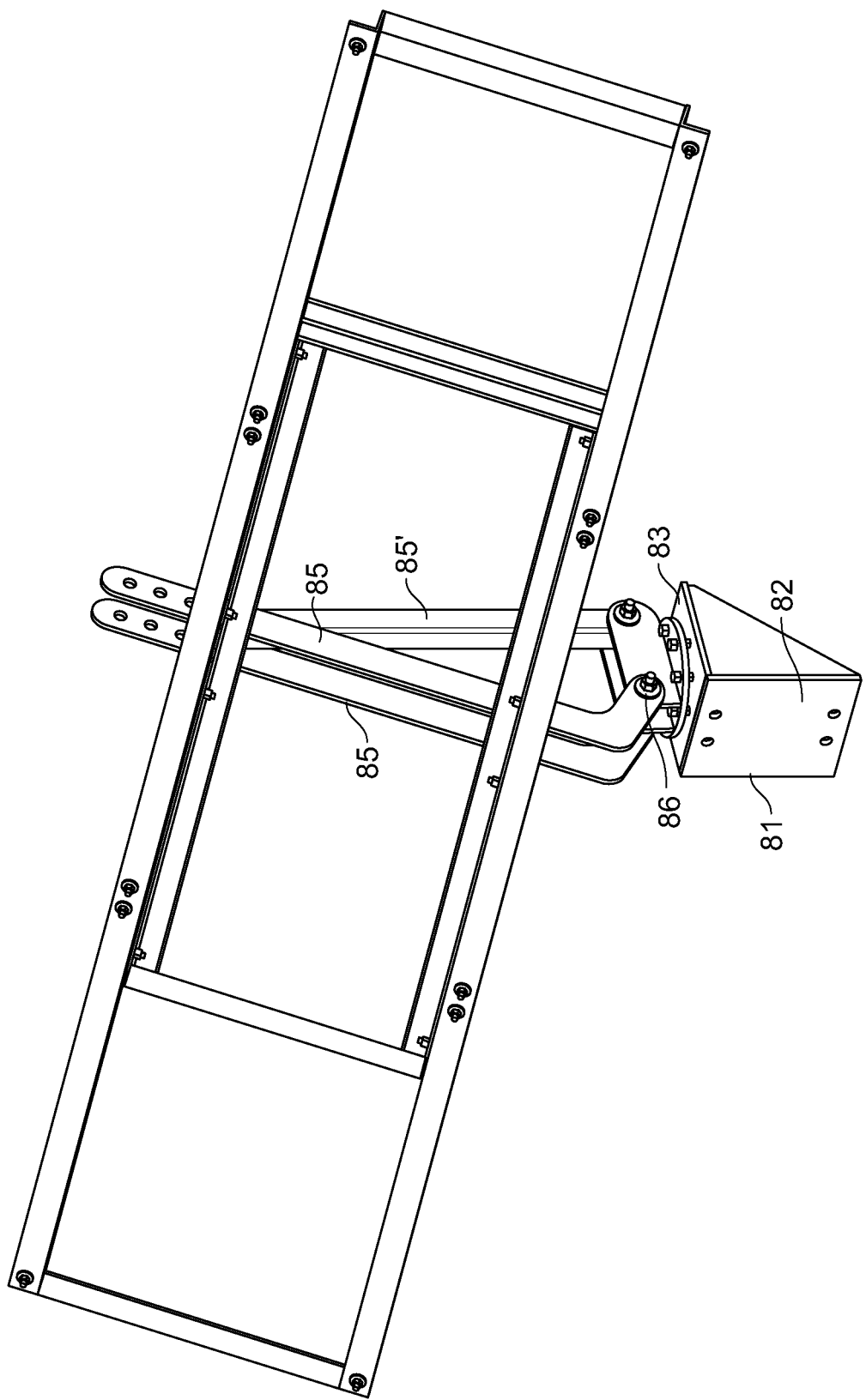
FIG. 6 depicts the solar panel and associated connections of the system in a preferred embodiment.
Figure 6A:
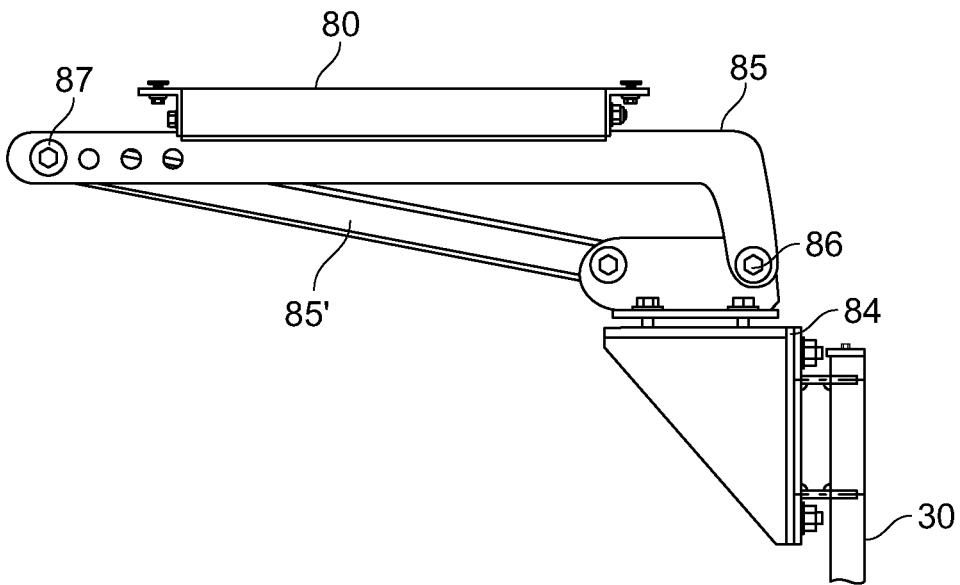
FIG. 6A depicts the pivotal arms of the solar panel in a first position.
Figure 6B:
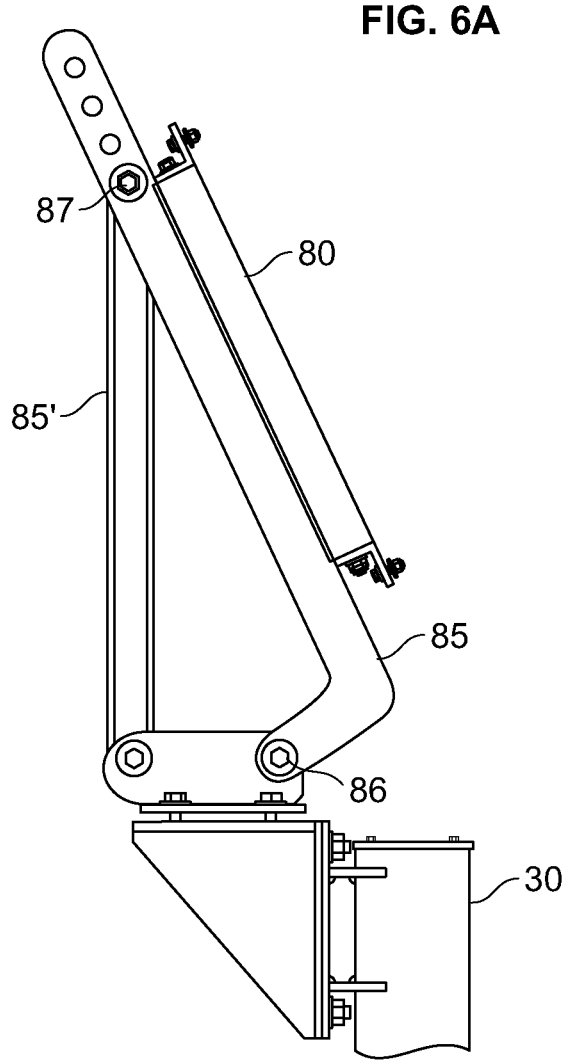
FIG. 6B depicts the pivotal arms of the solar panel in a second position.
Figure 7:
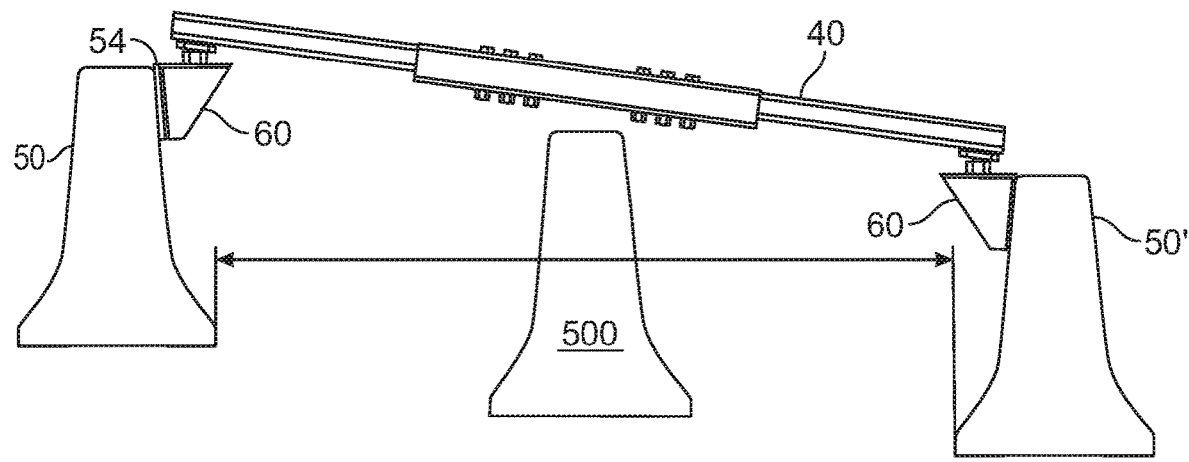
FIG. 7 depicts the base support of the present system when used with roadways of different elevations.

Referring now to FIG. 5A, Vertical brace 70 comprises a central portion 71 and two adjustable end portions 72, 72'. Central portion 71 includes a plurality of spaced apart apertures 710 running along the length of said central portion. Each of said adjustable end portions 72, 72' include a plurality of spaced apart apertures 711, 711' running along the length thereof. Depending on the desired length of the vertical brace 70, apertures 710 are aligned with apertures 711, 711' and end portions 72, 72' are connected to the central portion 71 via a clevis pin (not shown), preferably with a reusable cotter pin (not shown). However, other connectors may be used. In one embodiment, each of said vertical brace comprises a pivotal connector, preferably an end tie rod 712 proximate the ends thereof. One for connection to said support bracket 60 and another for connection to said vertical support 30. The end tie rod 712, in this embodiment, is threaded at one end 713 which threads into a threaded end of the vertical brace 70, allowing for further adjustment of the length of the vertical brace 70. Preferably, said vertical brace 70 is connected to said vertical support 30 via a collar 75 (as best seen in FIGS. 5A and 5B) on said vertical support 30. Collar 75 is preferably adjustable along the length of said vertical support 30. The adjustable lengths of the horizontal base and the vertical brace 70, together with the ball joints of the vertical support and the horizontal base allows for the system to accommodate situations where the concrete barriers are at different heights, whilst allowing for the sign 20 to be readable and maintained in a substantially level position. In this embodiment, there are four vertical braces 70, although there may be none or at least one. It is preferred to have at least two vertical braces 70, normal to each other in order to meet applicable code requirements such as wind load, although vertical support 30 will remain relatively vertical with no vertical braces 70, one brace 70 or 2 braces at an angle other than 90 degrees to each other. Sign 20 is connected to said vertical support 30, above said collar 75, by a sign support collar (not shown), or by any suitable means. Referring now to FIGS. 6, 6A and 6B, Solar panel 80 is attached proximate the top of said vertical support 30. Preferably, said solar panel 80 is pivotally attached to said vertical support 30, to allow for angular adjustment of said solar panel allowing for optimal orientation for solar energy capture. The preferred range of angular adjustment is between 0 to 65 degrees relative to horizontal. In a preferred embodiment, the solar panel 80 is attached proximate the vertical support by a solar panel bracket 81, preferably a 90 degree bracket with a back 82 and a top 83. The back 82 is attached to the vertical support by four hex bolts received in a solar panel bracket plate 84 attached to the vertical support 30. The solar panel is attached to the top 83 of the solar panel bracket 81 by a hinged arm 85. Hinged arm 85 has a first end 86 and a second end 87. The first end 86 is pivotally connected to the top 83 of the bracket 81. In this embodiment, there is a second hinged arm 85' pivotally connected to the top of the bracket 81 but distant the pivotal connection of the first hinged arm 85. The second end 87 of both arms 85, 85' are pivotally connected to each other. The solar panel 80 is connected along the length of arm 85, such that when the first end 86 of arms 85, 85' pivot, the solar panel 80 moves angularly, preferably between 0 and 65 degrees. When arm 85 is 65 degrees from horizontal, arm 85' is 90 degrees from horizontal. The system 10 further comprises at least one battery box 90, preferably two battery boxes for storing energy captured by the solar panel 80 and powering the controller 100 and sign 20. Controller 100 provides a control of the message on the sign 20 as well as any other parameters as needed. The controller also provides regulated power to the sign 20, and may also record and transmit data related to the system. Referring now to FIG. 7, the system 10 is shown in use when there are two roadways of different elevations separated by a permanent median 500. In this instance, the base 40 is adjustably connected at a 10° differential in elevation at one end of the temporary barriers 50, 50' and the center line of the central support 30 is at 80° to allow for the central support and the sign to be level for the viewer to be able to read the sign. If needed, additional shim plates 54 may be used between the barriers 50, 50' and the brackets.

Figure 8:
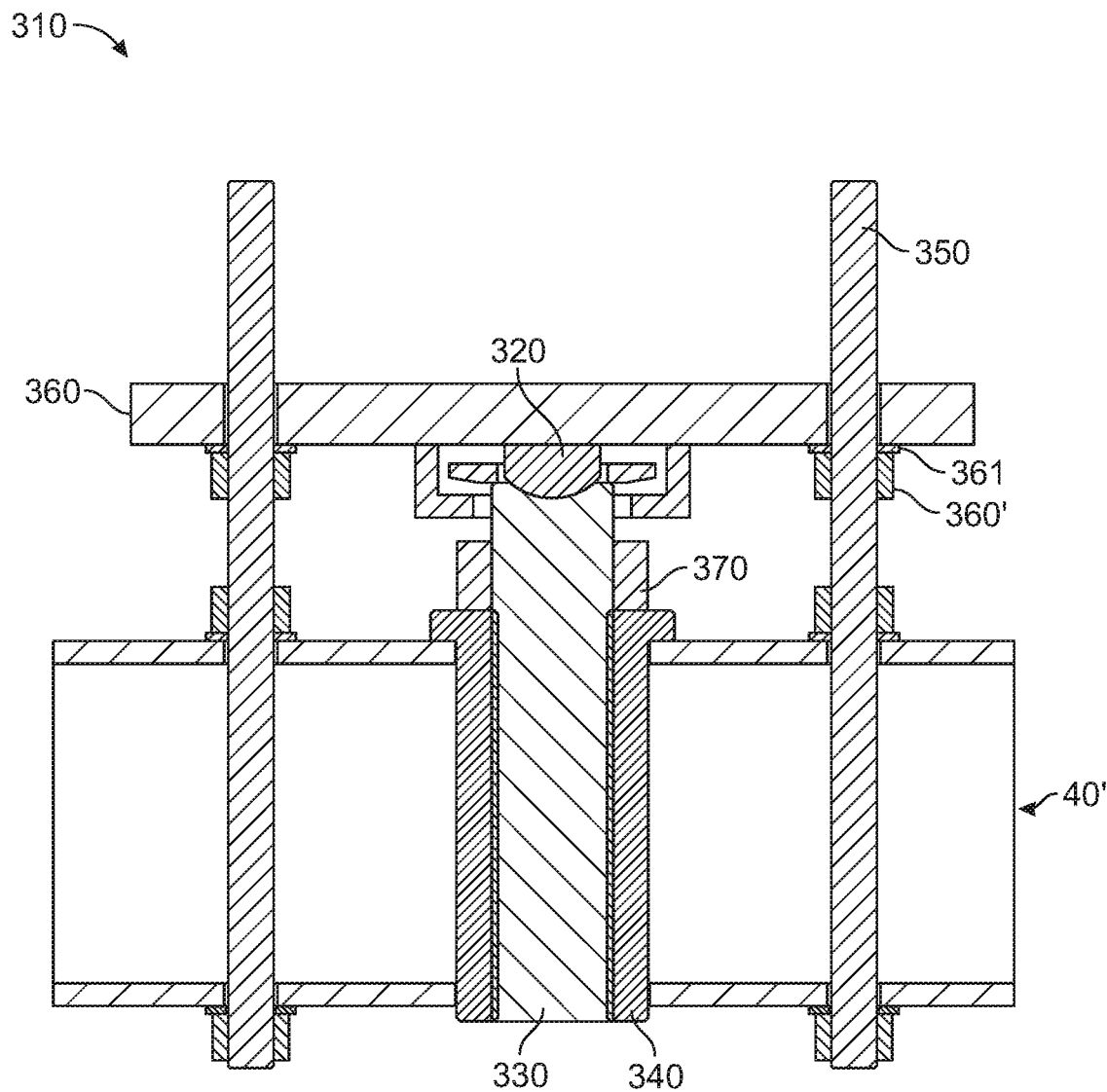
FIG. 8 depicts the central support for the vertical support on the horizontal base.

Referring now to FIG. 8, there is provided a cross section of a vertical support connector 310 comprising a plate 360, a ball joint 320 forming part of the plate 360 and an externally threaded rod 330 kept in place with an internal threaded bushing 340 and a hex jam nut 370. In this instance this differs from the vertical support connector of FIG. 4 in that the externally threaded rod 330 does not extend beyond the central support 40' allowing for more clearance underneath the central support 40'. The vertical support connector 310 includes two threaded rods 350 further connecting the plate 360 to the central support 40' reducing rotation of the vertical support 30 in relation to the central support 40' in high winds or the like. Each threaded rod 350 is situated on either side of the internally threaded rod 330 and proximate the perimeter of the plate 360. Each threaded rod 350 is secured in place by a number of hex nuts 360' preferably together with hex nut washers 361.

Figure 9:
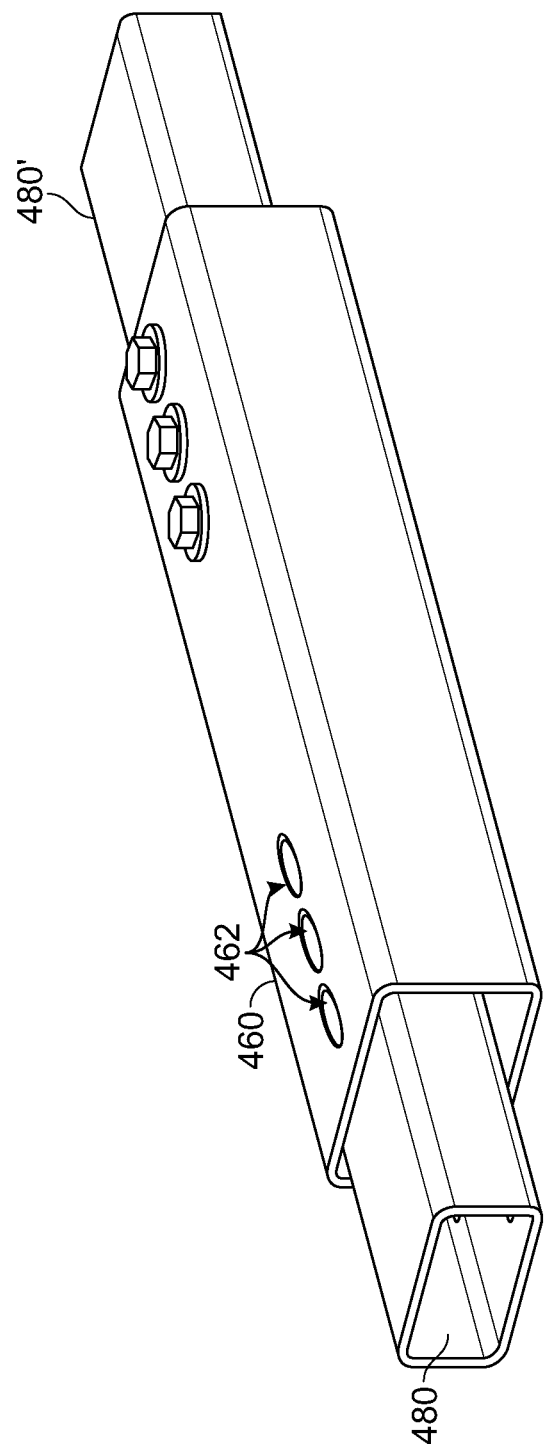
FIG. 9 depicts the base support with elongated slots on the central portion, in one embodiment.

Referring now to FIG. 9, there is provided a perspective view of central portion 460 and the central portion apertures in the form of elongated slots 462. End portions 480, 480' also include apertures 484 similar to those depicted in FIG. 3A. In this instance, when hex bolts are used to connect the end portions 480, 480' to central portion 460, the elongated slots 462 will allow the end portions 480, 480' to move along central portion 460 for fine adjustment of length during placement on a barrier and also facilitate absorbing load upon impact or collision. An alternative to this would be for the elongated slots to be on the end portions and the central portion apertures would be smaller and circular, still allowing for fine adjustment of end portions to central portion and facilitate absorbing load upon impact or collision.

Figure 10A:
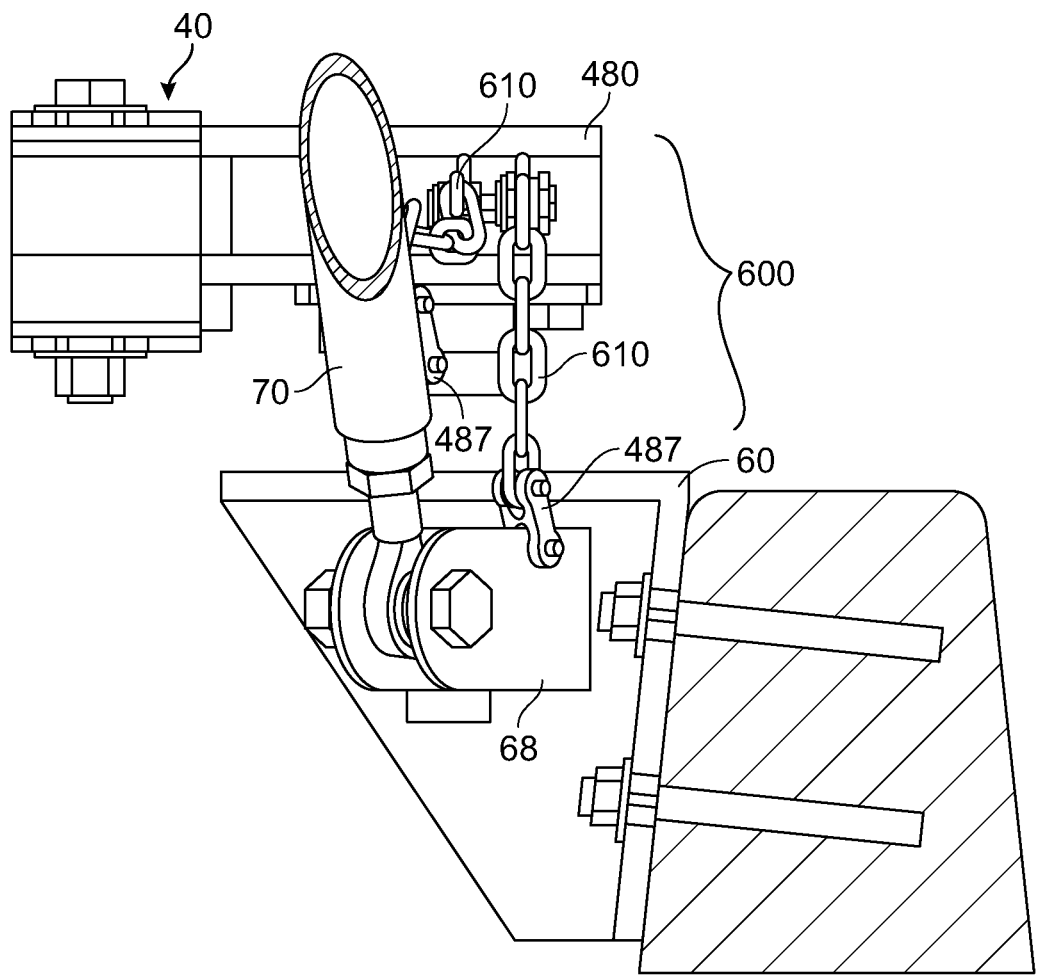
FIGS. 10A and 10B depict the tethering system for the vertical braces and the horizontal brace, in one embodiment.
Figure 10B:
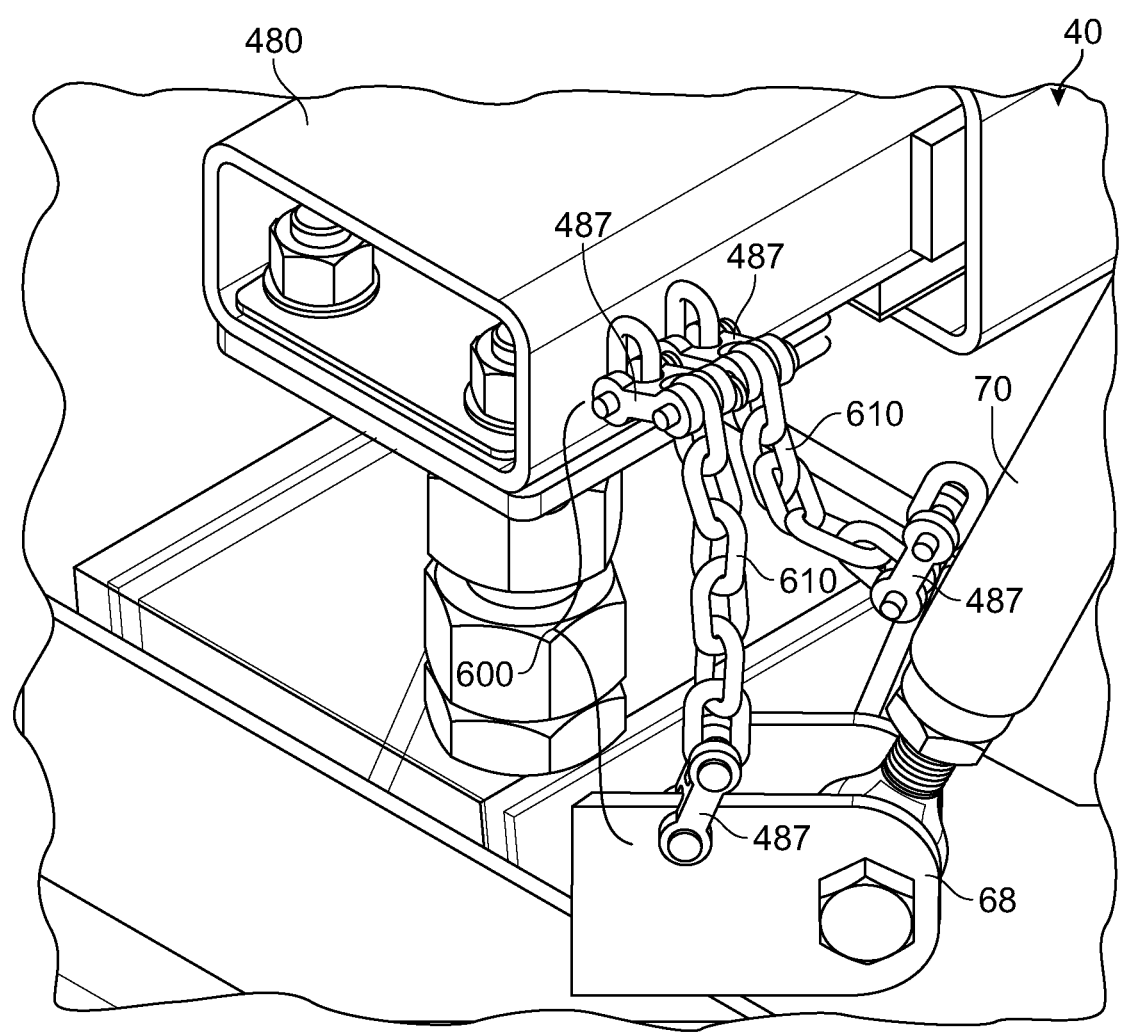

Referring now to FIGS. 10A and 10B, there is provided a perspective view of the vertical brace tether system 600 which tethers the horizontal base 40 to the support brackets 60, 60' (not shown) and to the vertical brace 70. In this instance, the tether system comprises a pair of chains 610, preferably commercial grade steel known to persons skilled in the art, wherein one end of the chains is connected to the end portions 480, 480' (not shown) via cotter pin shackles 487 and the other end of one chain is connected to one of the spaced apart plates 68, 68'(not shown) of the support brackets 60, 60'(not shown) via a cotter pin shackle 487, and the other end of the second chain is connected to the vertical brace 70 via a cotter pin shackle 487. The chains 610 are slack when connected to the cotter pin shackles 487, and the cotter pin shackles 487 allow for movement of the chain on the shackle for ease of installation.

Figure 11:
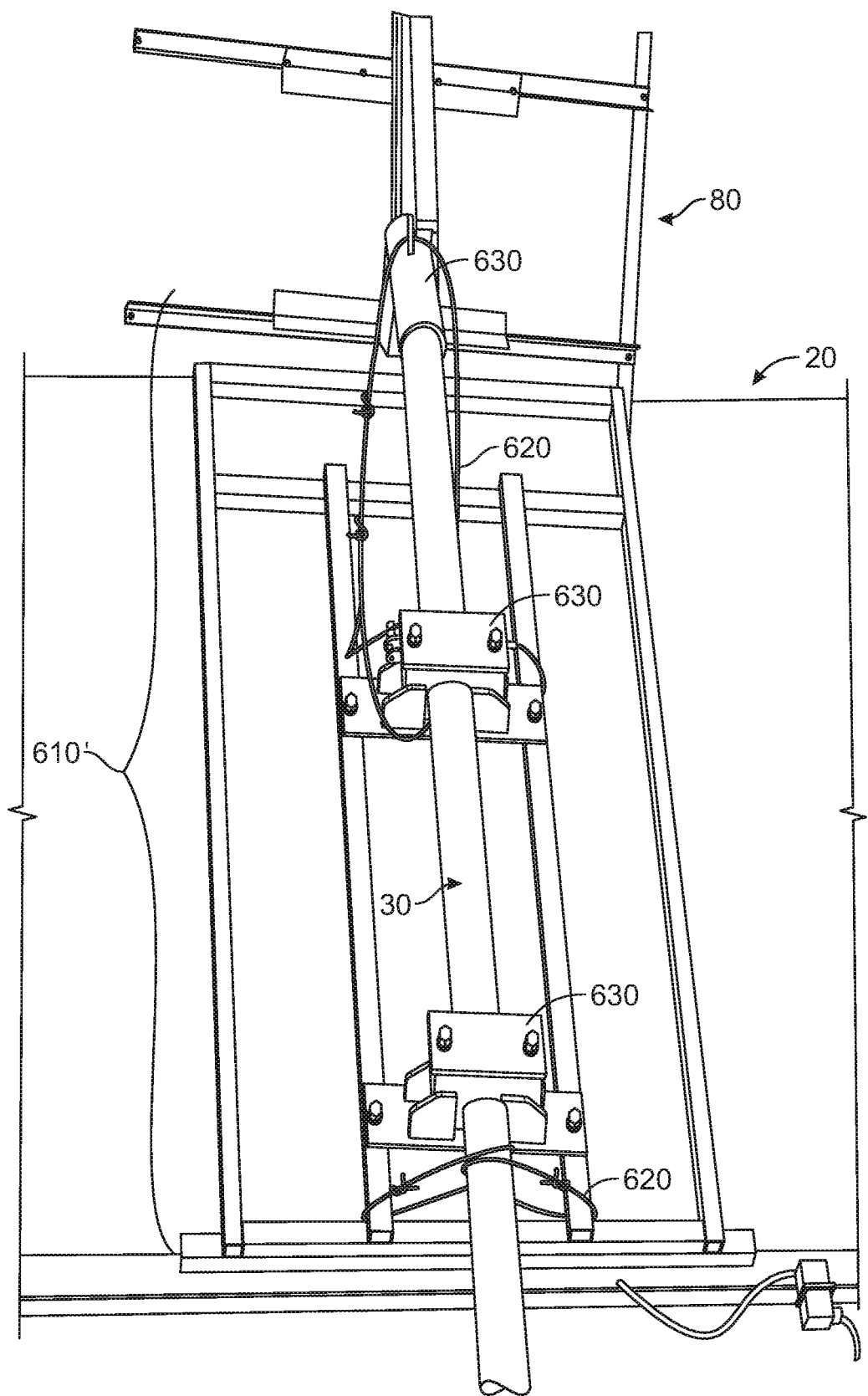
FIG. 11 depicts the tethering system for the sign and solar panel, in one embodiment.

Referring now to FIG. 11, there is provided a perspective view of the tether system 610 that tethers the sign 20 and solar panel 80 to the central support 30. In this instance, the sign tether system 610 comprises a cable 620, preferably a commercial grade steel cable. The cable 620 is slightly slacked to allow for some absorbing of any load should either the sign 20, solar panel 80 or both be detached from the central support 30 support brackets 630. If the support brackets 630 detach from the central support 30, the sign tether system 610 will reduce the sign 20 and/or solar panel 80 from detaching from the central support 30.

Example 1

MASH Testing of Sign Support System

The support system defined herein was tested under MASH 3-11. The evaluation criteria for test MASH 3-11 includes assessing structural adequacy and occupant risk during impact by a test vehicle. Structural adequacy evaluation criteria includes the test article should contain and redirect the vehicle or bring the vehicle to a controlled stop; the vehicle should not penetrate, underride, or override the installation although controlled lateral deflection of the test article is acceptable (as per TABLE 5-1. A. Safety Evaluation Guidelines of the American Association of State Highway and Transportation Officials Manual for Assessing Safety Hardware 2009). Occupant risk evaluation criteria includes detached elements, fragments, or other debris from the test article should not penetrate or show potential for penetrating the occupant compartment, or present undue hazard to other traffic, pedestrians, or personnel in a work zone. Deformations of, or intrusions into, the occupant compartment should not exceed limits set forth in Section 5.3 as follows: roof≤4.0 in. (102 mm), windshield-no tear of plastic liner and maximum deformation of 3 in. (76 mm), window-no shattering of a side window resulting from direct contact with a structural member of the test article (this requires the side windows to be in the up position for testing)—in cases where the windows are laminated, the guidelines for windshields will apply, wheel/foot well and toe pan areas≤9 in. (229 mm), side front panel (forward of A-pillar)≤12 in. (305 mm), front side door area (above seat)≤9 in. (229 mm), front side door area (below seat)≤12 in. (305 mm), and floor pan and transmission tunnel areas≤12 in. (305 mm); and Appendix E. (as per TABLE 5-1. D. Safety Evaluation Guidelines of the American Association of State Highway and Transportation Officials Manual for Assessing Safety Hardware 2009); the vehicle should remain upright during and after collision—the maximum roll and pitch angles are not to exceed 75 degrees (as per TABLE 5-1. F. Safety Evaluation Guidelines of the American Association of State Highway and Transportation Officials Manual for Assessing Safety Hardware 2009); Occupant impact velocities (OIV) maximum limit for the longitudinal and lateral component is 40 ft/s (12.2 m/s) (as per TABLE 5-1. H. Safety Evaluation Guidelines of the American Association of State Highway and Transportation Officials Manual for Assessing Safety Hardware 2009); and occupant ridedown acceleration maximum limit for longitudinal and lateral component is 20.49 G (as per TABLE 5-1. I. Safety Evaluation Guidelines of the American Association of State Highway and Transportation Officials Manual for Assessing Safety Hardware 2009). MASH 3-11 evaluated the possible interaction of a test vehicle with the sign support system and evaluated the performance of the cross-bolted F-shape barrier pinned to the underlying asphalt (3 inches thick). which involved impacting a pinned-down F-shape barrier at the critical impact point (CIP) with a quad-cab pickup truck (2270 kg test inertia mass) at a target impact speed and angle of 100 km/h and 25 degrees. The actual impact speed and angle were 100.7 km/h and 24.7 degrees, respectively, which were within the MASH specified tolerances. After the impact, the vehicle was successfully contained and redirected. The vehicle did not interact with the sign support system. The sign support system did not fail due to the impact and the sign remained upright and supported as initially installed. The sign support system tested resulted in below maximum limits of the occupant impact velocity (OIV) and the occupant ridedown acceleration. In this example, the barrier base for the sign support system comprised two spaced apart 4000 mm long by 1067 mm high, x-type temporary concrete barriers (MTOD 911.190). Each temporary concrete barrier was pinned to the road base using a single 38 mm diameter drift pin (MTOD 911.162). The barriers differ slightly from standard x-type in that they are built to the increased height of 1067 mm to allow the sign to be installed over top of typical median barriers. The barriers are built to 4000 mm long to allow for uneven or sloping ground as well as increased portability. Each of the barriers used a pinning void to allow installation of the drift pin helping to reduce the deflection of the barriers on impact. The support system was attached to the concrete barriers using steel brackets and a structural swivel joint. The joint allows for sloping of the road in any direction, as well as installation on isometric roadways. The joint is height-adjustable as well to allow for varying median barrier heights. During testing it was observed that the swivel joint helped to reduce the shock load of the vehicle impact by allowing minor rotation, which in turn prevented cracking of the barriers and deflection of the sign.

The frame of the sign has adjustable, telescopic outriggers (end portions) that can accommodate various widths between barriers. The outriggers were installed using torqued fasteners (i.e. bolts) located in slotted holes. During testing, the outriggers compressed slightly within the slotted holes, using friction of the bolts to help absorb the impact loads. The outriggers also have a restraining chain mitigating the outriggers from becoming detached from the support system in the event of a very severe collision. The chain attached the end of the outrigger to the bracket on the concrete barrier supports at each corner.

Hollow structural steel bracing (vertical brace) was installed from the base of the support bracket to a collar on the sign pole, just below the sign cabinet. This bracing is adjustable in length using multiple holes, as well as a threaded insert for fine adjustment. The hardware is vibration resistant by using lock nuts and cotter pins to prevent the bolts from coming loose. The vertical bracing is design for compression and tension loads. Structurally any 2 of the braces at 90 degrees to each other will support the loads, however 4 braces were installed in the event that one was damaged in an impact, the sign remains functional and safe. The ends of the bracing area also attached to the barrier brackets using restraint chains to prevent the bracing from entering the travelled portion of the road in the event of a severe impact broking the bracing connection.

The sign pole was attached to the frame using a swivel joint inserted into a threaded bushing that allows the sign to be installed plumb in all directions, regardless of the road slope. This threaded bushing also helps increase the clearance over the permanent median barrier as the bushing is recessed into the frame. During testing it was observed that this joint allowed minor rotation upon impact and prevented any oscillation or harmonic resonance from being transferred from the frame to the pole. Very minor deflection was observed at the top of the pole. The pole was bolted to the swivel joint using a flange connection, but two of the bolts extended entirely through the sign frame to limit twisting of the pole in the threaded bushing.

The sign cabinet was attached to the sign pole using two clamping brackets. In addition, the sign was tethered to the pole using steel cables to prevent the sign from coming free from the sign pole if it was directly impacted by an oversize load, or by flying debris in an impact. The tested deflection of x-type barrier (unrestrained) was approximately 300 mm. The tested deflection (restrained and assembled with sign based) was less than 50 mm.

As many changes can be made to the preferred embodiment without departing from the scope thereof; it is intended that all matter contained herein be considered illustrative and not in a limiting sense.

The invention claimed is:

1. A support system, for supporting an item, said system being mountable on at least two spaced apart foundation members, said system comprising:
   i) a base support having a first end and a second end, each of said first end and second end being articulately connectable to first and second foundation members respectively;
   ii) a vertical support for supporting said item, said vertical support having a first end and a second end wherein said second end is connectable to said base support; at least one item tether for tethering said item to said vertical support; at least one vertical brace, said vertical brace having a first end and a second end; wherein said first end of said vertical brace is connectable to said vertical support between said first end and said second end of said vertical support; and said second end of said vertical brace is connectable proximate one end of said base support; wherein said base support further comprises at least one vertical support connector for reducing a) rotation of said vertical support on said base support and b) detachment of said vertical support from said base support; and at least one vertical brace tether for tethering said at least one vertical brace to said base support.

2. The support system of claim 1 wherein said base support is length adjustable.

3. The support system of claim 2 wherein said base support comprises two base supports connectable to each other by a central base support; wherein each of said base supports further comprise a central portion and two end portions, wherein said central portion further comprise complementary spaced apart apertures allowing for telescopic connecting of each of said end portions to said central portion wherein said complementary spaced apart apertures on said central portion are selected from being: i) larger than the complementary spaced apart apertures of each of said end portions; and ii) smaller than the complementary spaced apart apertures of each of said end portions.

4. The support system of claim 3 wherein said vertical support is articulately mountable on said central base support.

5. The support system claim 2 wherein said vertical support is articulately mountable on said base support.

6. The support system of claim 2 wherein said vertical support is height adjustable.

7. The support system of claim 6 further comprising a base support tether for tethering said base support to at least one of said first foundation member bracket and said second foundation member bracket.

8. The support system of claim 7 wherein said tether is a chain.

9. The support system of claim 8 wherein said chain is a steel chain.

10. The support system of claim 2, wherein said base support further comprises:
   iii) a first foundation member bracket for connection to the first foundation member, said first foundation member bracket proximate said first end of said base support;
   iv) a second foundation member bracket for connection to the second foundation member distant said first foundation member, said second foundation member bracket proximate said second end of said base support.

11. The support system of claim 10 further comprising a controller.

12. The support system of claim 2 wherein said at least one vertical brace is length adjustable.

13. The support system of claim 1 wherein said base support comprises two base supports connectable to each other by a central base support; wherein each of said base supports further comprise a central portion and two end portions, wherein said central portion further comprise complementary spaced apart apertures allowing for telescopic connecting of each of said end portions to said central portion wherein said complementary spaced apart apertures on said central portion are selected from being: i) larger than the complementary spaced apart apertures of each of said end portions; and ii) smaller than the complementary spaced apart apertures of each of said end portions.

14. The support system of claim 13 wherein said vertical support is articulately mountable on said central base support.

15. The support system of claim 13 wherein said vertical support is height adjustable.

16. The support system of claim 13 wherein each of said two base supports further comprises:
   i) a first foundation member bracket for connection to the first foundation member, said first foundation member bracket proximate said first end of a first base support of said two base supports;
   ii) a second foundation member bracket for connection to the second foundation member distant said first foundation member, said second foundation member bracket proximate said second end of said first base support; and a second base support of said two base supports further comprises:
   iii) a first foundation member bracket for connection to the first foundation member, said first foundation member bracket proximate said first end of said second base support; and
   iv) a second foundation member bracket for connection to the second foundation member distant said first foundation member, said second foundation member bracket proximate said second end of said second base support.

17. The support system of claim 16 further comprising a base support tether for tethering said base support to at least one of said first foundation member bracket and said second foundation member bracket.

18. The support system of claim 13 wherein the larger spaced apart apertures are slot like.

19. The support system claim 1 wherein said vertical support is articulately mountable on said base support.

20. The support system of claim 1 wherein said vertical support is height adjustable.

21. The support system of claim 1 wherein said base support further comprises:
   i) a first foundation member bracket for connection to the first foundation member, said first foundation member bracket proximate said first end of said base support;
   ii) a second foundation member bracket for connection to the second foundation member distant said first foundation member, said second foundation member bracket proximate said second end of said base support.

22. The support system of claim 21 further comprising a controller.

23. The support system of claim 1 wherein said at least one vertical brace is length adjustable.

24. The support system of claim 23 wherein said at least one vertical brace is pivotally connectable to said vertical support.

25. The support system of claim 1 wherein said item comprises at least one of: a sign, a radar based traffic monitoring sensor, a Bluetooth vehicle tracking sensor, a video detection traffic monitoring sensor, weather station equipment for monitoring at least one of wind, temperature, barometer, humidity, and radar, a road temperature sensor, a road surface sensor, a pollution monitoring sensor, a CCTV camera (that may be remotely controlled), at least one communication device, preferably selected from a cellular modem, a Bluetooth (near field communications for sign or other device control), a wi-fi modem, a satellite cellular modem (for areas outside cell tower range) and combinations thereof.

26. The support system of claim 25 wherein said sign comprises a variable message sign.

27. A method of mounting the system claim 25, said method comprising:
   xi) anchoring at least one foundation member bracket, to each spaced apart foundation member;
   xii) mounting, said each of said ends of said two length adjustable base supports to a respective foundation member bracket;

xiii) connecting said base supports to each other with a central base support;
xiv) attaching, a vertical support to said central base support;
xv) attaching at least one vertical brace to said vertical support;
xvi) levelling said vertical support;
xvii) attaching a sign to said vertical support;
xviii) attaching a solar panel to said vertical support;
xix) orienting said sign and said solar panel as required; and
xx) tightening any connections and attachments ensuring a secure connection.

28. The support system of claim 27 wherein said at least one power source is a solar panel and said at least one power source tether is a solar panel tether.

29. The support system of claim 28 wherein said tether is a cable.

30. The support system of claim 28 wherein said at least one item tether is a cable.

31. The support system of claim 28 wherein said at least one vertical brace tether is a chain.

32. The support system of claim 28 wherein said system is MASH 3-11 2009 compliant.

33. The support system 28 wherein said system is: i) Canadian Highway Bridge Design Code 2016 compliant for at least one of the following: wind, seismic, environmental loading and combinations thereof; ii) American Association of State Highway and Transportation Officials 2016 compliant; and combinations thereof.

34. The support system of claim 28 further comprising at least two spaced apart end to end parallel barriers.

35. The support system of claim 28 comprising at least two vertical braces normal to one another.

36. The support system of claim 1 further comprising a power source.

37. The support system of claim 36 wherein said power source comprises at least one of a solar panel, a battery, a wind turbine generator, a generator, preferably a propane, gas or diesel generator, a fuel cell, preferably a hydrogen or other type of fuel cell, and combinations thereof.

38. The support system of claim 37 further comprising at least one power source tether for tethering said at least one power source to said vertical support.

39. The support system of claim 38 wherein said tether is a cable.

40. The support system of claim 38 wherein said at least one item tether is a cable.

41. The support system of claim 38 wherein said at least one vertical brace tether is a chain.

42. The support system of claim 38 wherein said system is MASH 3-11 2009 compliant.

43. The support system 38 wherein said system is: i) Canadian Highway Bridge Design Code 2016 compliant for at least one of the following: wind, seismic, environmental loading and combinations thereof; ii) American Association of State Highway and Transportation Officials 2016 compliant; and combinations thereof.

44. The support system of claim 38 further comprising at least two spaced apart end to end parallel barriers.

45. The support system of claim 38 comprising at least two vertical braces normal to one another.

46. A method of mounting the system claim 36, said method comprising:

xxi) anchoring at least one foundation member bracket, to each spaced apart foundation member;
xxii) mounting, said each of said ends of said two length adjustable base supports to a respective foundation member bracket;
xxiii) connecting said base supports to each other with a central base support;
xxiv) attaching, a vertical support to said central base support;
xxv) attaching at least one vertical brace to said vertical support;
xxvi) levelling said vertical support;
xxvii) attaching a sign to said vertical support;
xxviii) attaching a solar panel to said vertical support;
xxix) orienting said sign and said solar panel as required; and
xxx) tightening any connections and attachments ensuring a secure connection.

47. The support system of claim 1 further comprising a controller.

48. A method of mounting the system of claim 1, said method comprising:
i) anchoring at least one foundation member bracket, to each spaced apart foundation member;
ii) mounting, said each of said ends of said two length adjustable base supports to a respective foundation member bracket;
iii) connecting said base supports to each other with a central base support;
iv) attaching, a vertical support to said central base support;
v) attaching at least one vertical brace to said vertical support;
vi) levelling said vertical support;
vii) attaching a sign to said vertical support;
viii) attaching a solar panel to said vertical support;
ix) orienting said sign and said solar panel as required; and
x) tightening any connections and attachments ensuring a secure connection.

49. The support system of claim 1 wherein said at least one item tether is a cable.

50. The support system of claim 1 wherein said at least one vertical brace tether is a chain.

51. The support system of claim 50 wherein said chain is a steel chain.

52. The support system of claim 1 wherein said system is MASH 3-11 2009 compliant.

53. The support system of claim 1 wherein said system is: i) Canadian Highway Bridge Design Code 2016 compliant for at least one of the following: wind, seismic, environmental loading and combinations thereof; ii) American Association of State Highway and Transportation Officials 2016 compliant; and combinations thereof.

54. The support system of claim 1 further comprising at least two spaced apart end to end parallel barriers.

55. The support system of claim 54 wherein said at least two barriers are preferably temporary concrete barriers.

56. The support system of claim 55 wherein said temporary concrete barriers are each pinned down to a road.

57. The support system of claim 1 comprising at least two vertical braces normal to one another.

* * * * *